(12) United States Patent
Bogoni et al.

(10) Patent No.: US 9,137,591 B2
(45) Date of Patent: Sep. 15, 2015

(54) ALL OPTICAL PROCESSING CIRCUIT FOR CONFLICT RESOLUTION AND SWITCH CONFIGURATION IN A 2×2 OPTICAL NODE

(75) Inventors: Antonella Bogoni, Pisa (IT); Luca Poti, Pisa (IT); Mirco Scaffardi, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1050 days.

(21) Appl. No.: 12/597,784

(22) PCT Filed: May 1, 2007

(86) PCT No.: PCT/EP2007/054234
§ 371 (c)(1),
(2), (4) Date: Apr. 19, 2010

(87) PCT Pub. No.: WO2008/131802
PCT Pub. Date: Nov. 6, 2008

(65) Prior Publication Data
US 2010/0208317 A1    Aug. 19, 2010

(51) Int. Cl.
*G02F 3/00* (2006.01)
*H04Q 11/00* (2006.01)

(52) U.S. Cl.
CPC ............. *H04Q 11/0005* (2013.01); *G02F 3/00* (2013.01); *H04Q 11/0066* (2013.01); *H04Q 2011/002* (2013.01); *H04Q 2011/005* (2013.01);
(Continued)

(58) Field of Classification Search
CPC ....... G02F 3/00; G02F 3/024; G02F 2203/15; H04Q 11/0066
USPC ............................ 359/108, 107; 370/357, 358
See application file for complete search history.

(56) References Cited

U.S. PATENT DOCUMENTS 6,801,349 B2 * 10/2004 Kim et al. ..................... 359/108

OTHER PUBLICATIONS

International Search Report for PCT/SE2007/054234, mailed Apr. 11, 2008.

(Continued)

*Primary Examiner* — Audrey Y Chang
(74) *Attorney, Agent, or Firm* — Nixon & Vanderhye P.C.

(57) ABSTRACT

An optical processing circuit, such as a combinatorial network, comprises an arrangement of optical logic gates suitable for use in combination with a switched optical node of the kind having at least first and second input ports and two output ports, the node being configurable into either a cross or a bar configuration, and in which the optical processing circuit is arranged so as to receive at least three optical input signals which respectively comprise a packet identifier signal PIH which identifies whether or not a first input signal is present at the first input port of the switched optical node, the first input port being assigned a higher priority than the second input port, a first destination address AH indicating the output port of the switched optical node to which a first information carrying signal, received at the first input port, is intended to be passed, and a second destination address AL indicating the output port of the switched optical node to which a second information carrying signal, received at the second input port, is intended to be passed, and in which the processing circuit is configured to generate from these three optical input signals the following optical output signals: a contention resolution control (CRC) signal which has a first value if a routing conflict is present and a second if it is not; and a switch control generation (SCG) signal indicating whether the associated switched optical node is to be set in a cross or bar configuration.

11 Claims, 3 Drawing Sheets

(52) U.S. Cl.
CPC ............... *H04Q2011/0015* (2013.01); *H04Q 2011/0039* (2013.01); *H04Q 2011/0041* (2013.01); *H04Q 2011/0052* (2013.01); *H04Q 2011/0058* (2013.01)

(56) References Cited

OTHER PUBLICATIONS

Scaffardi et al., "All-Optical Combinatorial Network based on SOAs for Packet Contention Resolution in a 2×2 Photonic Node", Optical Fiber Communication and the National Fiber Communication and the National Fiber Optic Engineers Conference, Mar. 2007, pp. 1-3, XP031146723.

Matera et al., "Proposal of an all Optical Shuffle Multihop Network", European Transactions on Telecommunications and Related Technologies, AEI, Milano, IT, vol. 4, No. 2, Mar. 1, 1993, pp. 97-103, XP000370015.

Prucnal, "Optically Processed Self-Routing, Synchronization, and Contention Resolution for 1-D and 2-D Photonic Switching Architectures", IEEE Journal of Quantum Electronics, IEEE Service Center, Piscataway, NJ, US, vol. 29, No. 2, Feb. 1, 1993, pp. 600-612, XP000349810.

Bogoni et al., "OTDM-based Optical Communications Networks at 160 Gbit/s and Beyond", Optical Fiber Technology, Academic Press, London, US, vol. 13, No. 1, Dec. 9, 2006, pp. 1-12, XP005749706.

G. Berrettini et al., "Ultrafast Integrable and Reconfigurable XNOR, AND, NOR, and NOT Photonic Logic Gate", IEEE Photonics Technology Letters, vol. 18, No. 8, Apr. 15, 2006, pp. 917-919.

* cited by examiner

| $A_H$ | $A_L$ | $PI_H$ | CRC | SCG |
|---|---|---|---|---|
| 0 | 0 | 0 | 0 | 0 |
| 0 | 0 | 1 | 1 | 1 |
| 0 | 1 | 0 | 0 | 1 |
| 0 | 1 | 1 | 0 | 1 |
| 1 | 0 | 1 | 0 | 0 |
| 1 | 1 | 1 | 1 | 0 |
| 1 | 0 | 0 | 0 | 0 |
| 1 | 1 | 0 | 1 | 0 |

ALL OPTICAL PROCESSING CIRCUIT FOR CONFLICT RESOLUTION AND SWITCH CONFIGURATION IN A 2×2 OPTICAL NODE

This application is the U.S. national phase of International Application No. PCT/EP2007/054234, filed 1 May 2007, which designated the U.S. the entire contents of which are hereby incorporated by reference.

TECHNICAL FIELD

This technology relates to improvements in optical circuits, in particular to an all optical processing circuit for conflict resolution and switch configuration in a 2κ2 optical node. It is especially suited for use in conflict resolution and routing in a node of an optical communications network or optical computers.

BACKGROUND

Optical 2×2 switches are known which have two input ports and two output ports and which are configurable in either a cross or a bar configuration. When set in the bar configuration, a signal received at a first input port IP1 is connected to a first output port OP1 and a signal received at the second input port IP2 is connected to a second output port OP2. When in the cross configuration the signal at the first input port IP1 is instead connected to the second output port OP2 and likewise the signal at the second input port IP2 is connected to the first output port OP1. This functionality enables information arriving at an input to be steered to either of the outputs and is well known in communication networks for routing. Groups of 2×2 switch nodes can be combined to give switching between more than two inputs and outputs if required.

Such switched optical nodes have application in computers and in communications networks. For example, packetized information may be sent to an input which carries with it a label containing routing information in the form of a destination address $A_{MN}$ where M identifies the label containing the address and N is an integer value which indicates which one of N output ports of the switch the incoming signal is to be passed to. An address may indicate a final destination on a network, for example, with the switched node knowing which output port links to that address by being aware of its location within the network. Alternatively, it may indicate directly a specific output port of the switch. When a packetised signal arrives at an input node of the switch, this routing information is extracted and used to set the switch in either the cross or bar configuration so as to provide the correct route to the destination.

A problem arises if two signals arrive, at respective input ports, at the same time, and both want to be sent to the same output port. To ensure that the switch behaves predictably this can be overcome by associating a priority value with each input port, one being given a higher priority than the other, so that most times there will always be one incoming signal with a higher priority than the other. Any information arriving at the input with the high priority will get its requested routing and the information at the other port will be routed to its correct output port only if possible. If not, due to a conflict, a conflict will be signalled.

To date, such optical 2κ2 switches have been implemented using a combination of optical and electronic components. The priority information and address information has been extracted from the incoming signals by converting it to an electrical signal for processing. An electrical processing circuit has then been provided which takes these signals and from them provides the drive signals for setting the switch in the cross or bar configuration and indicating a conflict if appropriate. This electronic domain processing and the need to convert from the optical to the electronic domain slows the throughput of the switch and has been found to be limiting in the maximum rate at which signals can be passed.

SUMMARY

An optical processing circuit comprises an arrangement of optical logic gates suitable for use in combination with a switched optical node of the kind having at least first and second input ports and two output ports, the node being configurable into either a cross or a bar configuration, and in which the optical processing circuit is arranged so as to receive at least three optical input signals which respectively comprise:

a packet identifier signal $PI_H$ which identifies whether or not a first input signal is present at the first input port of the switched optical node, the first input port being assigned a higher priority than the second input port;

a first destination address $A_H$ indicating the output port of the switched optical node to which a first information carrying signal, received at the first input port, is intended to be passed; and a second destination address $A_L$ indicating the output port of the switched optical node to which a second information carrying signal, received at the second input port, is intended to be passed;

and in which the processing circuit is configured to generate from these three optical input signals the following optical output signals:

a contention resolution control (CRC) signal which has a first value if a routing conflict is present and a second if it is not; and a switch control generation (SCG) signal indicating whether the associated switched optical node is to be set in a cross or bar configuration.

The optical processing circuit, or combinatorial network, implemented using optical logic gates, when combined with other suitable optical elements (namely an optical switch that can be set in a cross or bar configuration, conflict resolution circuitry and associated circuitry for extracting address and priority signals from incoming information signals), enables an all optical switched node to be provided. Previously, conflict resolution CRC and switch control SCG processing has always been performed in the electronic domain which is slower than optical processing in most instances.

The processing circuit may process the input signals to provide output signals in which the processing is performed entirely in the optical domain, i.e. without converting any of the input signals into electrical signals, and may comprise only a combination of optical logic gates.

The destination address signals $A_H$ and $A_L$ and packet identifier signal PIH may comprise respective one-bit signals. Also the CRC and SCG signals may comprise one bit signals which are suitable for controlling a 2×2 optical switched node. This eases the implementation of an optical logic circuit.

Where the destination address signals have one bit, a first state (e.g. $A_H, A_L = 0$) may indicate that the information carrying signal wants to be routed to a first output port of a switch or equally that no address is specified because no information carrying signal is present (which can be inferred by looking at the value of the packet identifier PI. In its second state (e.g. $A_H, A_L = 1$) it may always indicate that an information carrying signal is present and that the second output port is specified. The optical circuit may be configured in such a way as to deal with this potential ambiguity automatically.

The packet identifier signal may have a first value (e.g. zero) if no input signal is present and a second value, (e.g. one) if a signal is present.

Most preferably, the optical processing circuit may comprise a combination of only NOR gates, AND gates, and OR gates. It may comprise three NOR gates, two AND gates and one OR gate. Each gate may have two inputs and a single output as is known in the art of logic gate design.

More specifically the first destination address may be fed to a first input of a first AND gate along with the second destination address which is fed to the second input of the first AND gate. The output of the first AND gate may then be fed to a first input of a first OR gate. The first and second destination addresses may also be fed to respective first and second inputs of a NOR gate, the output of which is fed to a first input of a second AND gate. The priority signal may be fed to the other input of the second AND gate, and the output of this second and gate fed to a second input of the first OR gate.

The output of the first OR gate will then provide the CRC value. This can be expressed logically as:

($A_H$ AND $A_L$) OR (($A_H$ NOR $A_L$) AND $PI_H$)

The skilled person will appreciate that in certain arrangements the OR gate could be replaced with an XOR gate if it can be arranged such that the gate never receives two logical 1 inputs at the same time.

Additionally, the second destination address and the priority signal may be fed to respective inputs of a second NOR gate, the output of which is fed to the first input of a third NOR gate. Finally, the first destination address may be fed to a second input of the third NOR gate. The third NOR gate will then provide the SCG value. This can be expressed logically as:

SCG=($A_L$ NOR $PI_H$)NOR $A_H$

This arrangement of logic gates provide an especially simple arrangement with a low number of optical components which minimises the time for the signals to propagate through the circuit.

A suitable truth table which will be implemented by the processing circuit using the combination of logic gates listed in the preceding paragraphs is shown in FIG. 2 of the accompanying drawings.

One or more of the logic gates may be implemented using at least one semiconductor optical amplifier (SOA). In fact, in a most preferred arrangement each logic gate may be implemented using one or less SOA's (although other optical elements may be provided with it). The skilled man will understand that the term SOA in this context should be interpreted broadly to cover any optical device which exhibits XGM as a non-linear effect.

For example, the XOR gate, where provided, may be implemented using cross gain modulation (XGM) in an SOA combined with an auxiliary counter propagating signal.

The OR gate may, for example, be implemented using a coupler element, such as a standard 3 db optical split connected "in reverse". This is possible in this arrangement because the two inputs fed to the coupler are never able to be logic 1 at the same due to the circuit logic (although they can be logic 0 at the same time).

The NOR gate can be implemented by exploiting four wave mixing effects (FWM) in an SOA. The AND can be implemented by exploiting FWM in an SOA.

The optical processing circuit may therefore comprise only four SOA's.

The skilled person will be aware of how to implement a logic gate using an SOA, as taught for example in the paper "Ultrafast Integrable and reconfigurable XNOR, AND, NOR and NOT photonic Logic gate", G. Berretini, A. Simi, A. Malacarne, A. Bogoni and L. Poti, Photon. Techno. 1 Lett. Vol. 18, n. 8, 917-919, April 2006.

DESCRIPTION OF EXAMPLE EMBODIMENTS

Figures 1, 2:
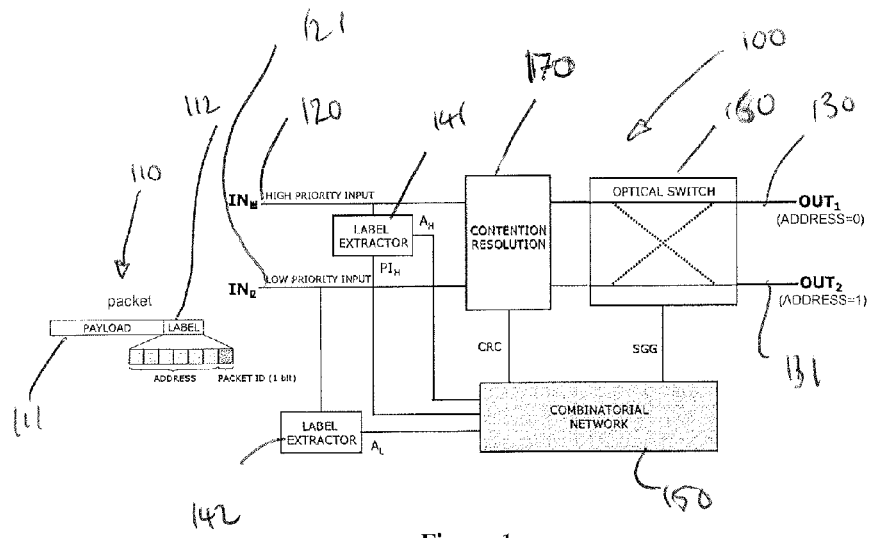
FIG. 1 is an overview of a switch architecture and packet format for routing packets between different nodes a the switch according to their priority.
FIG. 2 is a truth table for the logic implemented by the optical processing circuit of FIGS. 2-4.

FIG. 1 illustrates the main components of an all optical switched optical node 100 for use, amongst other things, in an optical communication network. It is well known to route information along paths across an optical network. The information may be packetised, in which case sequential packets 110 of information are transmitted across the network which each comprise a payload 111 of data/information and an associated label 112. The label contains information which indicates the destination address of the associated packet.

A 2×2 optical node has two inputs 120,121 and two outputs 130,131. Incoming information signals can be received at either input and can be received simultaneously in some cases. Upon receipt the information is stripped out of the labels by respective label extractors 141,142 to give destination addresses and a priority is assigned. The first input port in this example is given a higher priority than the other, so all signals it receives are considered to be of higher priority than signals at the other input port. In this embodiment the stripped data taken from a signal arriving at the first input 120 will comprise optical signals having a single bit representing an address $AI_H$ and a packet identifier $PI_H$ assigned to it by the high priority input port. For a signal arriving at the other input 121 the optical signals will comprise an address $A_L$ and a packet identifier $PI_L$. In practice the lower priority $PI_L$ can be ignored or even need not be produced since it is only important to know if a signal is present at the high priority input port.

These optical signals are passed to an optical processing circuit, or combinatorial network 150. The network processes the input signals $A_H$, $A_L$ and $PI_H$ to determine if a routing conflict is present and also which of a crossed or bar configuration the switch 160 must be set at to give the correct routing. It is the switch 160 that sets the path of the signals through the node.

The conflict resolution output signal CRC is passed to a conflict resolution circuit 170 that processes the two incoming signals before they are passed to the Optical switch 160.

Figure 3:
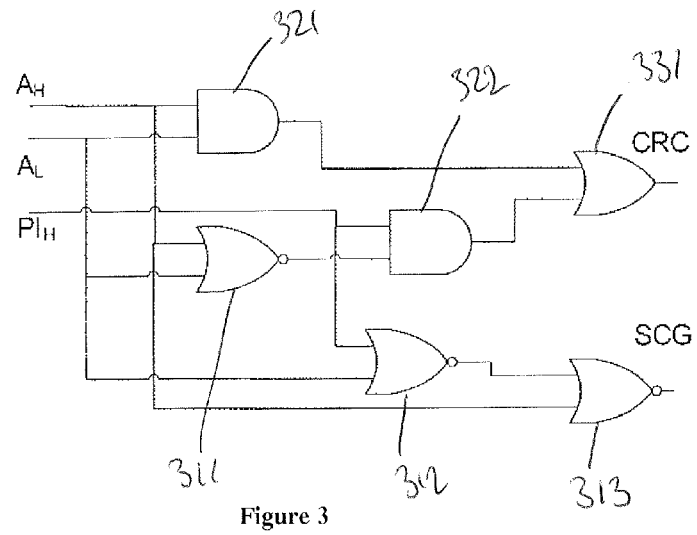
FIG. 3 is an overview of an optical processing circuit implemented using optical logic elements which enables the correct operation of the contention and switching blocks of FIG. 1.

The optical processing circuit 150 implements processing logic so as to determine the correct values of CRC and SCG for any given combination of input signals AH, AL and PIH where each signal can have a value of 0 or 1 in this embodiment. The circuit 150 comprises all optical logic gates so that all processing is performed in the optical domain. The outputs CRC and SCG are also optical signals. The logic is shown in the truth table of FIG. 2, and the implementation using logical components is shown in FIG. 3 and, in block diagram form with optical components in FIG. 4. It can be seen that the circuit is compact and requires only six logic gates-three NOR gates 311, 312, 313, two AND gates 321,322 and a single OR gate 331. Each of the gates is implemented using a semiconductor optical amplifier except for the OR gate 331 which is implement using an optical coupler.

Figure 4:
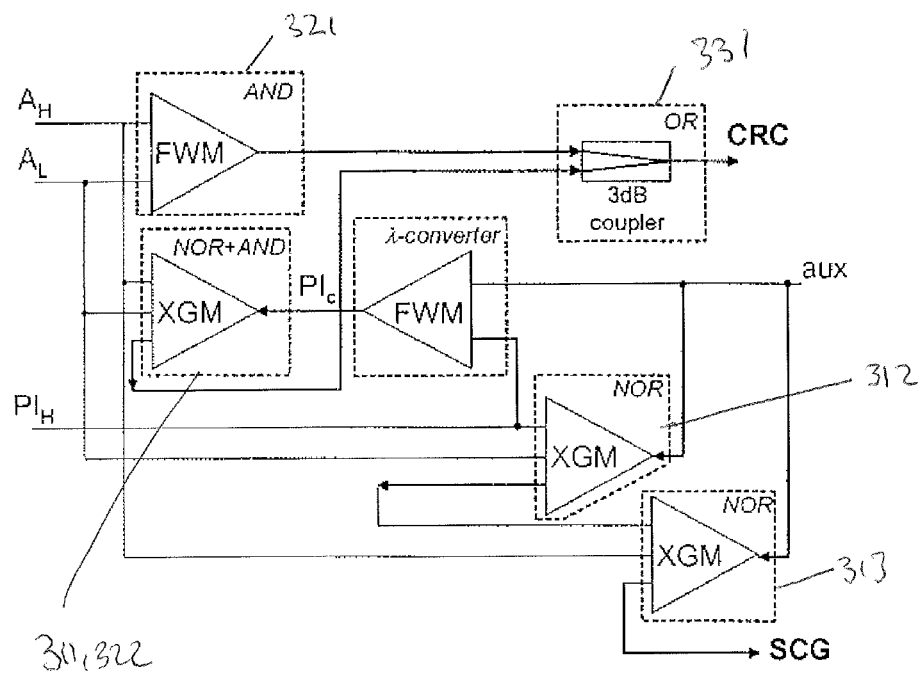
FIG. 4 is a more detailed overview of the logic elements of FIG. 3.
Figure 5:
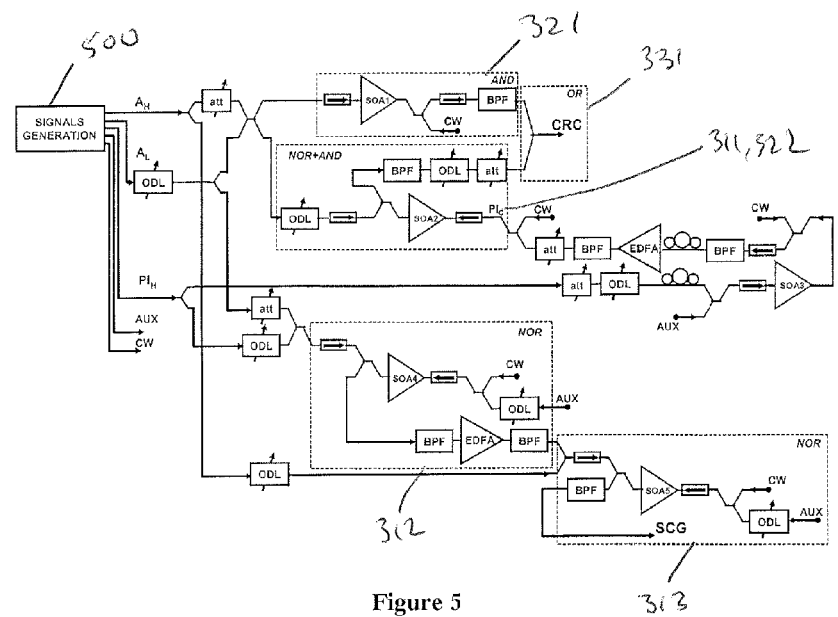
FIG. 5 is a physical level example of a circuit that implements the logic of FIGS. 3 and 4.

FIG. 5 illustrates in detail an experimental optical processing circuit which has been constructed by the applicant to verify the correct functionality of the circuit of FIGS. 3 and 4. Input signals $A_H$, $A_L$ and $PI_H$ were simulated using a signal generator 500 formed from a mode locked fibre laser producing 10 ps second optical pulses at a repetition rate of 10 GHz and an optical wavelength of 1550.9 nm. This simulation was intended to represent a high-speed optical communication network. In order to evaluate the performance of the logic circuit, a pseudo-random bit sequence (PRBS) 27-1 is mapped onto the pulses from the source by means of a Mach Zender interferometer. AL was a wavelength-converted replica of AH.

$A_H$ and $A_L$ are fed into SOA1, both with a power of 9.6 dBm. In SOA1 they interact generating a FWM signal at the new wavelength $\lambda_{CRC}$=1549.3 nm=$2\lambda_H$-$\lambda_L$ that represents the outcome of the AND function. The same signals, both with a power of 5 dBm, interact in the SOA2 inducing XGM to the counter-propagating signal PIC (power of PIC is −2.5 dBm). PIC is a wavelength converted replica of PIH obtained through FWM in the SOA3 between $PI_H$ and a pulse train (AUX) at $\lambda=\lambda_L$=1552.5 nm. In this way SOA2 counter-propagating signal has the same wavelength as the FWM out from the SOA1 and they can be coupled together in order to give the CRC output. Note that no interference will occur at this coupler 331 because two logic input ones are not allowed. SCG is obtained exploiting XGM in SOA4 and SOA5 where NOR logic functions are implemented. The power at SOA4 input is 4.7 dBm for $PI_H$, 2.5 dBm for $A_L$ and −19.5 dBm for AUX. SOA5 input powers are: 8.8 dBm for AH, 5.2 dBm for the signal coming from SOA4 and −14.2 dBm for the counter-propagating AUX.

The SOAs saturation level is biased through a Continuous Wave (CW) signal at a wavelength of $\lambda$=1540 nm that is injected counter-propagating at the following input powers: 11.5 dBm (SOA1), −2.9 dBm (SOA2), 10.9 dBm (SOA3), 3.5 dBm (SOA4), and 14.5 dBm (SOA5). Tunable Optical Delay Lines (ODL) and 0.3 nm optical band-pass filters are used in order to properly synchronize and select involved signals.

Figure 6:
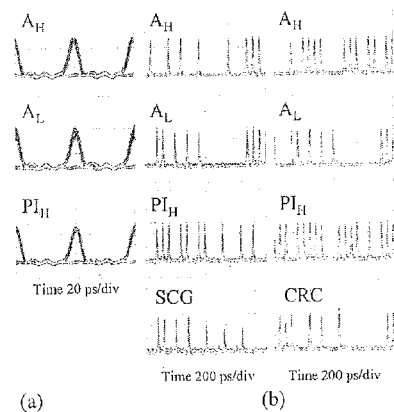
FIG. 6 is an eye diagram for the 3 input signals and corresponding CRC and SCG signals.
Figure 7:
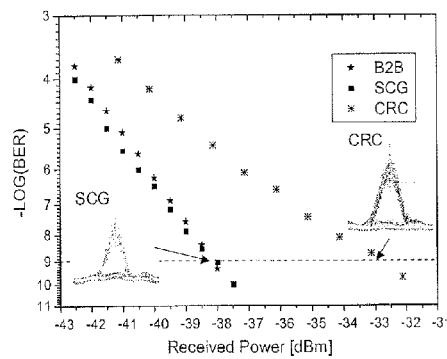
FIG. 7 shows the BER measure for SCG and CRC achieved using the exemplary circuit of FIG. 4 with the 3 signals represented by the eye diagram of FIG. 6.

Main performances for the combinatorial network are summarized in FIG. 6(a) where the input eye diagrams are shown for the three input signals together with the input sequences and the output SCG and CRC signals. The SCG and CRC sequences reveal the logic circuit works properly, i.e. according with the truth table in FIG. 2. The output sequences are not perfectly equalized due to residual patterning effect, but the contrast ratio is between 5.4 and 7 dB for the SCG and between 8.4 and 10 dB for the CRC. Bit Error Rate (BER) measurements were also performed on the test circuit of FIG. 5 in order to evaluate the noisiness of the output signals. The measurements are performed after a pre-amplified receiver and the results are shown in FIG. 7 of the accompanying drawings. At BER=$10^{-9}$ negligible penalty is present for the SCG and 5 dB power penalty for the CRC that can be mainly ascribed to the noise arising during the FWM process in SOA1 and SOA3. These performances should allow the output signals SCG and CRC driving contention resolution blocks and switches.

The invention claimed is:

1. An optical processing circuit, comprising:
an arrangement of optical logic gates for use in combination with a switched optical node having first and second input ports and two output ports, the node being configurable into either a cross configuration or a bar configuration, the first input port always having a higher priority than the second input port so that an input signal present at the first input port always has a higher priority for routing to one of the two output ports than an input signal present at the second input port,
wherein the optical processing circuit is arranged so as to receive three optical input signals which respectively comprise:
a packet identifier signal which identifies whether or not an input signal is present at the first higher priority input port of the switched optical node;
a first address indicating the output port of the switched optical node to which a first input signal, received at the first input port, is to be routed; and
a second address indicating the output port of the switched optical node to which a second input signal, received at the second input port, is to be routed;
wherein the optical processing circuit is configured to process and generate from the three optical input signals optical output signals including:
a contention resolution control (CRC) signal which has a first value if a routing conflict is present in the switched optical node and a second value if a routing conflict is not present in the switched optical node, where a CRC signal with the first value indicates that the input signal present at the first input port should be routed to the one of the two output ports; and
a switch control generation (SCG) signal indicating whether the switched optical node is to be set in a cross configuration or a bar configuration.

2. An optical processing circuit according to claim 1, wherein the processing in the optical processing circuit is performed entirely in the optical domain using a combination of optical logic gates.

3. An optical processing circuit according to claim 1, wherein each of the address signals and the packet identifier signal includes only one bit, and the CRC and SCG signals comprise one bit signals for controlling a 2κ2 optical switched node.

4. An optical processing circuit according to claim 2, wherein the logic gates comprise a combination of only NOR gates, AND gates, and OR gates.

5. An optical processing circuit according to claim 4, wherein the logic gates consist of three NOR gates, two AND gates, and one OR gate.

6. An optical processing circuit according to claim 4, wherein the first destination address is fed to a first input of a first AND gate along with the second destination address which is fed to the second input of the first AND gate, the output of the first AND gate is fed to a first input of a first OR gate, the first and second destination addresses are also fed to respective first and second inputs of a NOR gate, the output of which is fed to a first input of a second AND gate and further in which the priority signal is fed to the other input of the second AND gate, and the output of this second AND gate fed to a second input of the first OR gate such that the output of the first OR gate will provide the CRC value.

7. An optical processing circuit according to any one of claims 4-6, wherein each OR gate is implemented using a coupler element connected in a reverse configuration.

8. An optical processing circuit according to claim 2, wherein the second destination address and the priority signal are fed to respective inputs of a second NOR gate, the output of which is fed to the first input of a third NOR gate, and wherein the first destination address is fed to a second input of the third NOR gate such that the output of the third NOR gate will provide the SCG value.

9. An optical processing circuit according to any one of claims 4, 5, 6 and 8, wherein each NOR gate or each AND gate is implemented by exploiting four wave mixing effects (FWM) in a semiconductor optical amplifier (SOA).

10. An optical processing circuit according to claim 2, wherein one or more of the logic gates are implemented using at least one semiconductor optical amplifier (SOA).

11. A switched optical node comprising:
first and second input ports,
two output ports,
the node being configurable into either a cross configuration or a bar configuration,
the first input port always having a higher priority than the second input port so that an input signal present at the first input port always has a higher priority for routing to one of the two output ports than an input signal present at the second input port,
an optical processing circuit, coupled to the optical node is arranged so as to receive three optical input signals which respectively comprise:
a packet identifier signal which identifies whether or not an input signal is present at the first higher priority input port of the switched optical node;
a first address indicating the output port of the switched optical node to which a first input signal, received at the first input port, is to be routed; and
a second address indicating the output port of the switched optical node to which a second input signal, received at the second input port, is to be routed;
wherein the optical processing circuit is configured to process and generate from the three optical input signals optical output signals including:
a contention resolution control (CRC) signal which has a first value if a routing conflict is present in the switched optical node and a second value if a routing conflict is not present in the switched optical node, where a CRC signal with the first value indicates that the input signal present at the first input port should be routed to the one of the two output ports; and
a switched control generation (SCG) signal indicating whether the switched optical node is to be set in a cross configuration or a bar configuration.

* * * * *

UNITED STATES PATENT AND TRADEMARK OFFICE
CERTIFICATE OF CORRECTION

PATENT NO. : 9,137,591 B2  
APPLICATION NO. : 12/597784  
DATED : September 15, 2015  
INVENTOR(S) : Bogoni et al.

Page 1 of 1

It is certified that error appears in the above-identified patent and that said Letters Patent is hereby corrected as shown below:

In the Specification

In Column 1, Line 14, delete "2κ2" and insert -- 2x2 --, therefor.

In Column 1, Line 63, delete "2κ2" and insert -- 2x2 --, therefor.

In the Claims

In Column 6, Line 50, in Claim 3, delete "2κ2" and insert -- 2x2 --, therefor.

In Column 7, Line 17, in Claim 10, delete "arc" and insert -- are --, therefor.

Signed and Sealed this  
Third Day of May, 2016

Michelle K. Lee  
*Director of the United States Patent and Trademark Office*